(12) United States Patent
Irvine

(10) Patent No.: US 7,451,567 B2
(45) Date of Patent: Nov. 18, 2008

(54) FISHING LURE RETRIEVAL DEVICE

(76) Inventor: Edgar T. Irvine, 6351 N. Charlotte Ave., San Gabriel, CA (US) 91775

( * ) Notice: Subject to any disclaimer, the term of this patent is extended or adjusted under 35 U.S.C. 154(b) by 0 days.

(21) Appl. No.: 11/699,231

(22) Filed: Jan. 27, 2007

(65) Prior Publication Data

US 2008/0178515 A1    Jul. 31, 2008

(51) Int. Cl.
*A01K 97/00* (2006.01)
(52) U.S. Cl. .................................... 43/17.2; 43/44.97
(58) Field of Classification Search ............... 43/17.2, 43/44.9, 44.97, 4; 223/99; D22/149; D8/40
See application file for complete search history.

(56) References Cited

U.S. PATENT DOCUMENTS

| | | | | |
|---|---|---|---|---|
| 2,482,037 A | * | 9/1949 | Swaim | 43/17.2 |
| 3,039,223 A | * | 6/1962 | Pavek | 43/17.2 |
| 3,176,425 A | * | 4/1965 | Mudd | 43/17.2 |
| 3,688,429 A | * | 9/1972 | Mauck | 43/17.2 |
| 3,772,815 A | * | 11/1973 | Burgess | 43/17.2 |
| 4,737,057 A | * | 4/1988 | Olsson | 411/92 |
| 5,157,856 A | | 10/1992 | Packer | 43/17.2 |
| 6,305,119 B1 | | 10/2001 | Kacak | 43/17.2 |
| 6,931,780 B2 | | 8/2005 | Cote | 43/17.2 |

* cited by examiner

*Primary Examiner*—David J Parsley
(74) *Attorney, Agent, or Firm*—Mandel & Adriano

(57) ABSTRACT

The present invention is directed to a device for retrieving a snagged fishing lure.

5 Claims, 2 Drawing Sheets

FISHING LURE RETRIEVAL DEVICE

BACKGROUND OF THE INVENTION

In sport and recreational fishing, fishing lures with multiple hooks are often used as a substitute for live bait or as the preferred form of fish attractant.

Lures may be simple spoon type lures which are relatively inexpensive or "baits fish profile" lures which can be very expensive. Such lures often include arrays of multiple hooks attached to the end of the fish profile, or lure body. The lure body is generally intended to mimic the appearance and behavior of a small fish. Accordingly, when the (target) fish attempts to eat the lure body, the hook, or hooks, attached to the lure body buries itself in the target fish's mouth.

The hooks of the lure make the lure prone to snagging. This is especially so when fishing over coral or rocks or adjacent submerged tree branches. As a result, fishing lure retrievers have been developed with the aim of retrieving snagged lures. Most lures are specifically developed for a particular purpose; and often a fisherman (angler) will change lures during any given fishing session with a view to optimizing his or her catch. Accordingly, fishermen typically include several types of lure retrievers in their fishing kits for use depending upon the lure being used and the anticipated snag. Unfortunately, snagged lures are not generally visible to the angler and thus anglers may try different types of retrievers with a view to releasing or freeing any given lure from any given snag. Generally, lure retrievers fall into three broad categories: "break away", "extendable pole" and "sliders".

"Break away" lure retrieval devices are designed to incorporate a 'weak link' between the lure body and the hook(s). If a hook of the lure becomes snagged, the angler can intentionally break the link between the body and the hook; thereby leaving the hook, but retrieving the lure body. While offering a simple solution to the issue of a snagged lure, this method also presents disadvantages. Because fishing lines come in varying strengths, the size and strength of the 'weak link' must be carefully considered. Using an inappropriately sized link could cause the lure to break away from the hook under normal use—not only letting the target fish get away, but causing the hook to remain in the mouth of the fish, which can be detrimental to the fish's life. Additionally, this is considered to be a crude means of retrieving the lure body; with a certain amount of pride being associated with retrieving an intact fishing lure.

"Extendable pole"-type devices comprise extendable rods or poles, typically having a length from about 10 to about 18 feet. The end of the pole is usually mounted with some sort of device, e.g., a coil, for guiding the rod to the snagged fishing lure. The fishing lure is then jostled loose with the rod. These types of devices provide several disadvantages. To successfully use the extendable pole, the fisherman must coordinate holding and jostling the extendable retrieval pole while holding (or otherwise maintaining control over) the fishing pole. Additionally, the fisherman is limited by the length of the pole, i.e., he or she will only be able to retrieve lures that are within the reach/range of the pole. Furthermore, such devices may be unwieldy to transport and keep handy.

"Slider" type devices attach to the actual fishing line and 'slide' down the fishing line to the snagged lure. Slider retrievers can be sub-divided into several categories—each category employing different methods for actually freeing the snagged lure. The primary subcategories of sliders are "knockers", chain-type devices, and "latching" devices. Knockers use kinetic energy to knock, or hit, loose the lure. Some of the more resourceful anglers will invent their own version of knocker, using anything with significant weight or mass to slide down the line to knock the snagged lure. Chain-type devices combine the use of a weight with a series of chains. The weight is threaded onto the fishing line and allowed to slide down to the snagged lure. The chains are jostled in an attempt to ensnare a free hook of the lure. Once a chain is hooked onto the lure, the whole assembly is pulled to free the lure. "Latching" devices are also slid down to the fishing line to the snagged lure, but use some means of "latching" onto the lure once the device the reaches the lure. One example of such a device uses a cantilever action to grab the snagged lure and then, again, the entire assembly is pulled back up—hopefully, with the lure latched to the device.

Thus, anglers may require many types of lure retrievers in their kit in order to cope with the variety of snag situations which could occur in a fishing session. Mostly this is not practical and anglers often accept the loss of expensive lures as a necessary cost.

The present invention aims to alleviate and address some of the disadvantages of other fishing lure retrieval devices described above and otherwise present in the art, to provide an improved, convenient, easily manufactured lure retrieval device.

SUMMARY OF THE INVENTION

In view of the disadvantages inherent in the types of fishing lure retrieval devices now in the prior art, the present invention provides a fishing lure retrieval designed to slide down a fishing line to the snagged fishing lure and subsequently "grab" the fishing lure so that it may be retrieved.

To recover a snagged fishing lure, the present invention provides a heavy, flat elongated body, or plate, with at least one, "grabbing hole," situated towards an end of the elongated plate—i.e., towards an end along the longitudinal axis of the plate. On the opposing end of the longitudinal axis from the grabbing hole, on the edge of the plate, is a smaller hole or loop for attaching a retrieval line. Each grabbing hole has a slot extending from the hole to the edge of the plate, for receiving the fishing line; thus, the fishing line is fed through to the grabbing hole, thereby guiding the lure retrieval device, and more particularly the grabbing hole, over the snagged lure body.

When the lure retrieval device of the present invention is slid down a fishing line to the snagged fishing lure, the grabbing hole of the device receives the snagged fishing lure body. Pulling on the retrieval line of the device creates a tension between the lure and the lure retrieval device via the angle created between the planar axis of the lure retrieval device and the longitudinal axis of the lure body. This tension, helped by the friction-creating edge of the hole (e.g., caused by serration of the edge or by lining the edge with a sticky polymer) allows the angler to retrieve the snagged fishing lure.

Accordingly, the present invention provides a device for retrieving a snagged fishing lure attached to a fishing line comprising an elongated plate, having: (i) a means for attaching a retrieval line, said means positioned at an end of the elongated plate; (ii) at least one lure-grabbing hole, of a size sufficient to fit snuggly around fishing lure, said lure-grabbing hole positioned at an end of the elongated plate opposite from the means for attaching the retrieval line; and (iii) a narrow slit extending from an edge of the elongated plate to the lure-grabbing hole, for sliding a fishing line attached to a snagged fishing lure through; whereby the elongated plate is of a density sufficient to sink in freshwater and in saltwater.

In its preferred embodiment the present invention provides a device for retrieving a snagged fishing lure attached to a fishing line comprising a non-corrosive, metal oblong plate having: (i) two loops, one each at either end of the oblong plate, for attaching a retrieval line; (ii) two lure-grabbing holes, each positioned at an end of the oblong plate, the lure-grabbing holes having differing diameters, the two lure-grabbing holes sized to fit snugly around a fishing lure and having serrated edges; and (iii) two slits, one slit extending from one of the two lure-grabbing holes to a long edge of the oblong plate and the other slit extending from the other of the two lure-grabbing holes to a long edge of the oblong plate; whereby the oblong plate is of a density sufficient to sink in freshwater and in saltwater.

This section has outlined, rather broadly, the more important features of the invention in order that the detailed description thereof that follows may be better understood, and in order that the present contribution to the art may be better appreciated. Of course, additional features of the invention will be described hereinafter and which will form the subject matter of the claims appended hereto.

Those of skill in the art will appreciate that the conception, upon which this disclosure is based, may readily be utilized as a basis for the design of other structures, methods and systems for carrying out the several purposes of the present invention. It is important, therefore, that the claims be regarded as including such equivalent constructions insofar as they do not depart form the spirit and scope of the present invention.

Accordingly, it is an object of the present invention to provide a new fishing lure retrieval device which may be easily and efficiently manufactured and marketed.

It is a further object of this invention to provide a new fishing lure retrieval device which is of a durable and reliable construction.

Yet another object of the invention is to provide a new fishing lure retrieval device which may be early manufactured at low cost—with regard to both materials and labor; and which, accordingly, is then susceptible of low price of sale to the consuming public, thereby making such fishing lure retrieval device economically available to the buying public.

An even further object of the present invention is to provide a new fishing lure retrieval device which provides advantages over the fishing lure retrieval devices and methods currently available in the art, while also overcoming some of the disadvantages of the same; including, but limited to, convenience of carry and storage, simplicity of use, and ease of manufacture.

BRIEF DESCRIPTION OF THE FIGURES

A better and more complete understanding of the nature and objects of this invention can be had with reference to the following detailed description, taken in consideration with the accompanying drawings which form a part of this specification. Numerals of reference used in the detailed description correspond to parts similarly numbered in the figures, wherein.

DETAILED DESCRIPTION OF THE INVENTION

Figure 1:
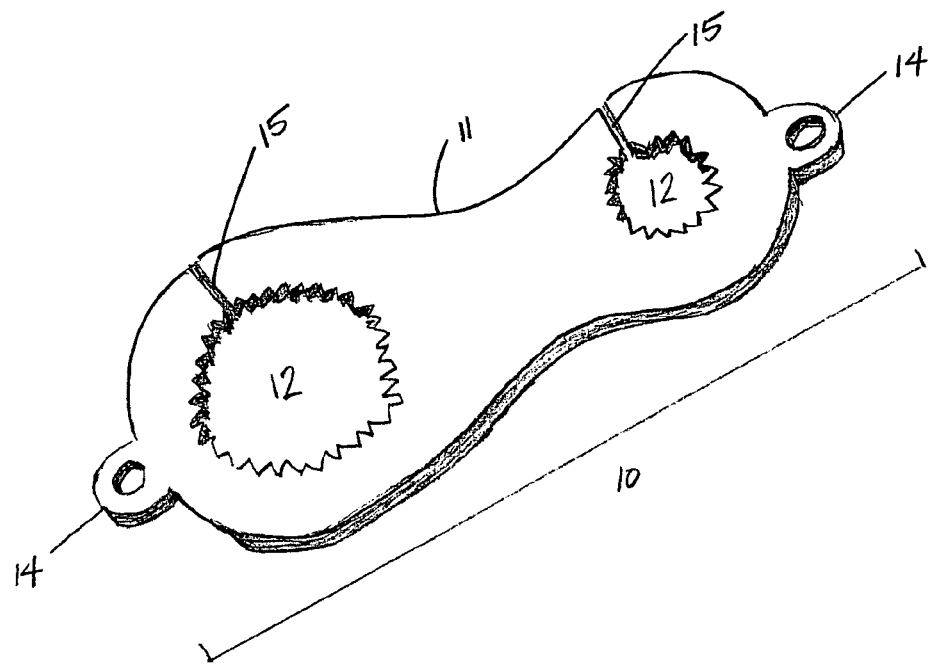
FIG. 1 is a perspective view of an embodiment of the invention.
Figure 2:
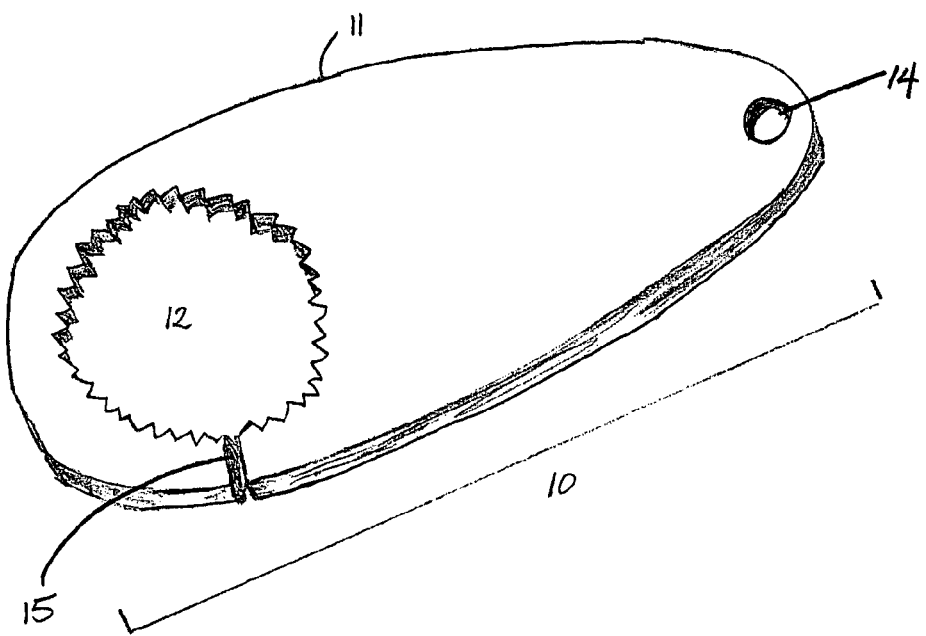
FIG. 2 is a perspective view of an alternative embodiment of the invention.

Referring to FIGS. 1-4, embodiments of the new fishing lure retrieval device of the present invention 10 are shown to comprise an elongated flat body, or plate, 11, having at least one "lure-grabbing hole" 12. The presently described device also has a means for attaching a retrieval line 14 and a slit 15 extending from the lure-grabbing hole 12 to the edge of the elongated plate 11. Each lure-grabbing hole 12 will have associated with it, a means for attaching a retrieval line 14 positioned at the end of the elongated plate opposite the lure-grabbing hole and a slit 15 extending from the lure-grabbing hole 12 to the edge of the elongated plate 11; this is clearly seen in FIG. 2, which shows an embodiment of the invention only having one lure-grabbing hole.

The elongated plate of the present invention will have a density sufficient to allow the device to sink in either fresh- or salt-water. Accordingly, the device of the present invention should be made of a heavy, or dense, and non-corrosive material. In a preferred embodiment the fishing lure retrieval device of the present invention is made of a non-corrosive metal. However, any dense, non-corrosive material, such as would be familiar to those of skill in the art will suffice.

The figures show generally oblong shaped elongated plates. However, any elongated shape is suitable, e.g., rectangles, diamond or oblongs. In preferred embodiments, the fishing lure device; the use of a rounded-edge helping to minimize the chances of the retrieval device itself being caught or snagged on an obstruction. This preferred embodiment is exemplified in the figures—such as with the generally oblong shape shown in FIG. 2 or the "figure-eight"-like shape shown in FIG. 1. Other appropriate elongated shapes for the device will be apparent to those of skill in the art; especially upon understanding all of the concepts of and mechanism used in the present invention.

The edge of the lure-grabbing holes are either serrated or lined with a sticky substance so as to enhance the "grabbing" ability of the fishing lure retrieval device of the present invention. In a preferred embodiment of the invention, the edges of the lure-grabbing holes 12 are serrated, or otherwise not smooth. In other embodiments of the invention, the lure-grabbing holes are lined with rubber. Those of skill in the art will appreciate other means by which to enhance the "grabbing" ability by altering the lure-grabbing hole edge(s).

Figure 3:
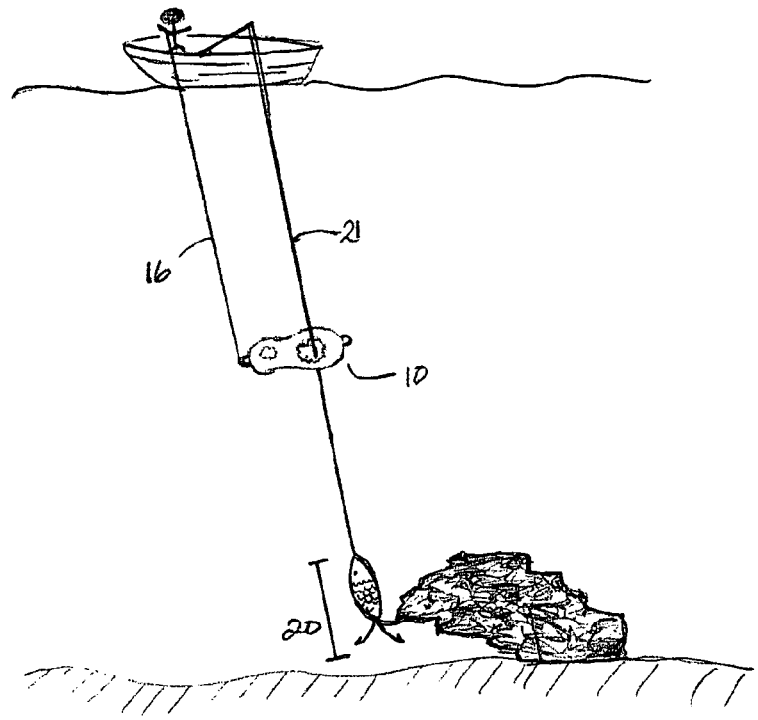
FIG. 3 shows an embodiment of the invention being deployed along a fishing line attached to a snagged fishing lure.
Figure 4:
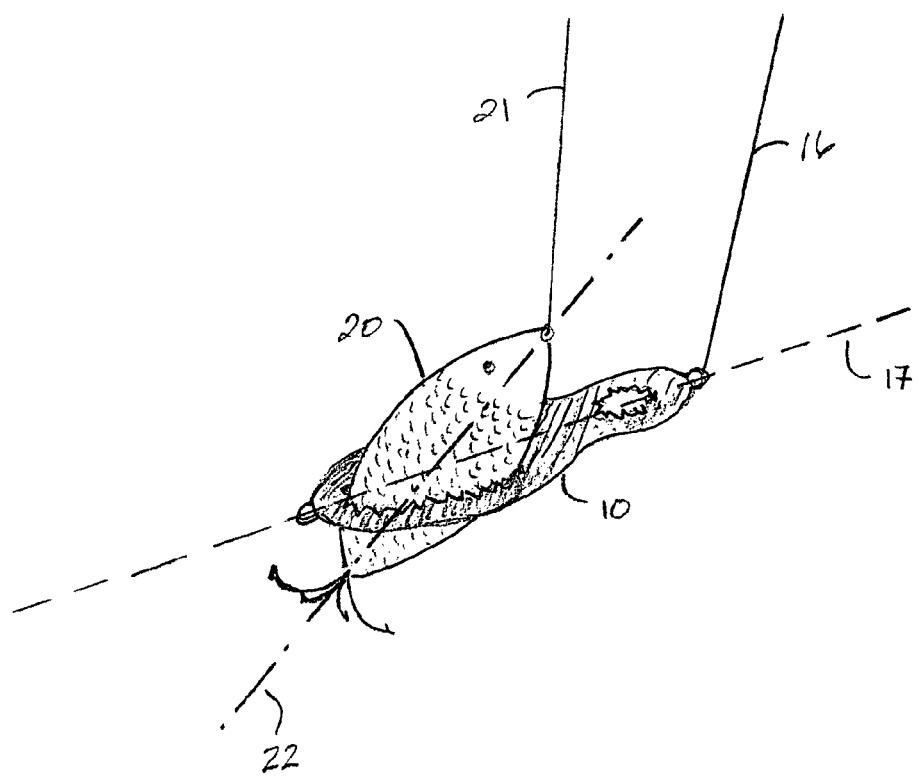
FIG. 4 shows retrieval of a previously snagged fishing lure using an embodiment of the invention.

FIGS. 3 and 4 depict the mechanism by which the present invention retrieves a snagged fishing lure. In FIG. 3, the fishing lure retrieval device of this invention 10 is attached to a retrieval line 16. The fishing line 21 that is attached to the snagged fishing lure 20 is passed through the slit 15 of the retrieval device such that the fishing line 21 is now thread through a lure-grabbing hole 12 of the retrieval device 10. The device 10 is slid down the fishing line 21 towards the snagged fishing lure 20. FIG. 4 shows the primary action by which the lure retrieval device of the present invention 10 is able to retrieve a snagged fishing lure 20. With the lure-grabbing hole 12 of the device 10, surrounding the snagged lure 20, the retrieval line 16 is pulled. When the angler pulls the retrieval line a tension is created between the device 10 and the fishing lure 20. While some of the grabbing, or gripping, ability of the present invention is provided by the friction created by the edge of the lure-grabbing hole itself, i.e., the friction created by a serrated edge or by an edge lined by a sticky substance, the primary action is by the tension created via the acute angle created between the longitudinal axis 22 of the lure body 20 and the axis the plane 17 of the elongated plate 11 of the lure retrieval device 10.

The weight, or density, of the device not only serves to add to the tension, by creating a downward force on the device as the angler pulls upward on the retrieval line to retrieve the snagged lure, but in certain embodiment can also be used like a 'knocker'-type device. As discussed above, knocker devices slide along the fishing line and are weighted so as to hit the snagged lure with force—thereby 'knocking' the snagged lure free. In embodiments of the present invention, the fishing lure retrieval device is of a weight sufficient to first knock the snagged lure loose. The lure is then retrieved as described above; with the lure-grabbing hole gripping the lure and the pull of the retrieval line creating an angle of tension between the device and the lure body so as to be able to retrieve the snagged device merely by reeling in the retrieval line/device.

So, the advantages of the present invention are apparent. In addition to the ease and low cost of manufacture, the fishing lure retrieval device of the present invention provides a simplicity of use not previously seen. This invention is easy to store and/or carry; unlike devices known in the art, the present invention is not unwieldy and does not take up much space. Furthermore, an angler will find it elegantly easy to use: it does not require 'jangling chains' underwater, nor does it require coordinating holding the fishing line, while maneuvering the device. Additionally, the present invention does not pose any threat to losing one's catch.

Thus, an embodiment of the invention provides a device for retrieving a snagged fishing lure attached to a fishing line comprising an elongated plate having: (i) a means for attaching a retrieval line, said means positioned at an end of the elongated plate; (ii) at least one lure-grabbing hole of a size sufficient to fit snuggly around a fishing lure, said lure-grabbing hole positioned at an end of the elongated plate opposite from the means for attaching the retrieval line; and (iii) a narrow slit extending from an edge of the elongated plate to the lure-grabbing hole, for sliding a fishing line attached to a snagged fishing lure through, whereby the elongated plate is of a density sufficient to sink in freshwater and in saltwater. In certain embodiments, the invention the elongated plate of the invention has rounded edges and in certain other embodiments the elongated plate of the present invention is an oblong.

In some instances, the present invention has two lure-grabbing holes of differing size. In embodiments of the invention, the lure-grabbing hole, or holes, has a serrated edge; in other embodiments the edge of the lure-grabbing hole, or holes, is lined with a non-corrosive tacky substance. The non-corrosive tacky substance may be rubber or a polymer.

The device of present invention includes embodiments wherein the elongated plate is made from a non-corrosive material. In a preferred embodiment, the non-corrosive material is a metal. In some instances the device has a density sufficient to knock a snagged fishing lure.

In a preferred embodiment, this invention provides a device for retrieving a snagged fishing lure attached to a fishing line comprising a non-corrosive, metal oblong plate having: (i) two loops, one each at either end of the oblong plate, for attaching a retrieval line; (ii) two lure-grabbing holes, each positioned at an end of the oblong plate, the lure-grabbing holes having differing diameters, the two lure-grabbing holes sized to fit snuggly around a fishing lure and having serrated edges; and (iii) two slits, one slit extending from one of the two lure-grabbing holes to a long edge of the oblong plate and the other slit extending from the other of the two lure-grabbing holes to a long edge of the oblong plate, whereby the oblong plate is of a density sufficient to sink in freshwater and in saltwater.

With respect to the above detailed description and FIGS. 1-4, it is to be realized that the optimum dimensional relationships for the parts of the invention, to include variations in size (including, but not limited to the length of plate, distance from lure-grabbing hole to retrieval line attachment means, diameter of lure-grabbing hole), materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A device for retrieving a snagged fishing lure attached to a fishing line comprising an elongated plate having a figure eight shape with one end of the plate having a greater width than the respective opposite end of the plate, said plate comprising:
    (i) multiple means for attaching a retrieval line, said means positioned at each respective end of the plate, each means comprising a tab being integral with and extending outwardly from a peripheral edge at opposite ends of the plate with a hole extending through each tab;
    (ii) two lure-grabbing holes of differing sizes located on opposite ends of the plate with the smaller of the two holes being located in a portion of the plate comprising the smaller width, each hole being entirely serrated around the holes and each hole having a size sufficient to fit snuggly around a fishing lure, and each lure-grabbing hole positioned at each end of the elongated plate and each lure-grabbing hole positioned adjacent to and opposite from a respective means for attaching the retrieval line and
    (iii) two narrow slits, one each extending from a peripheral edge of the elongated plate to each respective lure grabbing hole, for sliding a fishing line attached to a snagged fishing lure through,
    whereby the elongated plate is of a density sufficient to sink in freshwater and in saltwater.

2. The device of claim 1, wherein the elongated plate has rounded edges.

3. The device of claim 1, wherein the elongated plate is made from a non-corrosive material.

4. The device of claim 3, wherein the non-corrosive material is a metal.

5. The device of claim 1, wherein the density is sufficient to knock a snagged fishing lure.

* * * * *